US008342606B2

(12) United States Patent
Le Texier et al.

(10) Patent No.: US 8,342,606 B2
(45) Date of Patent: Jan. 1, 2013

(54) MULTIMODAL HEADREST FOR VEHICLE SEAT

(75) Inventors: Maxime Le Texier, Toulouse (FR); Regis Leymat, Toulouse (FR); Louis Duroch, Aix en Provence (FR); Laurent Cecinas, Breuil Magne (FR)

(73) Assignee: Airbus Operations SAS, Toulouse (FR)

( * ) Notice: Subject to any disclaimer, the term of this patent is extended or adjusted under 35 U.S.C. 154(b) by 362 days.

(21) Appl. No.: 12/664,168

(22) PCT Filed: Jun. 10, 2008

(86) PCT No.: PCT/FR2008/051034
§ 371 (c)(1),
(2), (4) Date: Jun. 24, 2010

(87) PCT Pub. No.: WO2009/004211
PCT Pub. Date: Jan. 8, 2009

(65) Prior Publication Data
US 2010/0253125 A1     Oct. 7, 2010

(30) Foreign Application Priority Data

Jun. 15, 2007   (FR) .................................. 07 04275

(51) Int. Cl.
*B60N 2/48*     (2006.01)
(52) U.S. Cl. ........................................ 297/408
(58) Field of Classification Search ............ 297/408
See application file for complete search history.

(56) References Cited

U.S. PATENT DOCUMENTS

| 1,930,867 | A | * | 10/1933 | West ............................ 297/408 |
| 2,828,810 | A | * | 4/1958 | Barecki et al. ............. 297/408 X |
| 3,506,306 | A | * | 4/1970 | Herzer et al. ................ 297/408 |
| 3,537,749 | A | * | 11/1970 | Putsch et al. ................ 297/408 |
| 4,674,797 | A | * | 6/1987 | Tateyama .................... 297/408 |
| 4,682,817 | A | * | 7/1987 | Freber ......................... 297/408 |
| 4,693,515 | A | * | 9/1987 | Russo et al. ............ 297/408 X |
| 4,830,434 | A | * | 5/1989 | Ishida et al. ................. 297/408 |

(Continued)

FOREIGN PATENT DOCUMENTS

DE     102005030313 A1   12/2006
(Continued)

OTHER PUBLICATIONS

International Search Report and written opinion dated Nov. 23, 2009.

*Primary Examiner* — Rodney B White
(74) *Attorney, Agent, or Firm* — Perman & Green, LLP

(57) ABSTRACT

A seat for a vehicle, that includes a headrest with a headstall for supporting the head of a passenger in the seat, wherein the occupant may or may not wear a protection helmet depending on the circumstances. The headstall can assume at least three stable positions: a first position for the cervical support of the head of the seat passenger in which the headrest provides a cervical support function with or without wearing a helmet; a second position for the occipital support of the head of the seat passenger in which the headrest provides an occipital support function without wearing a helmet; a third position for the occipital support of the head of the seat passenger in which the headrest provides an occipital support function while wearing a helmet.

7 Claims, 4 Drawing Sheets

U.S. PATENT DOCUMENTS

| | | | |
|---|---|---|---|
| 5,622,405 A | 4/1997 | Pitencel | |
| 5,992,937 A * | 11/1999 | Pilhall | 297/408 |
| 6,000,760 A * | 12/1999 | Chung | 297/408 |
| 6,511,130 B2 * | 1/2003 | Dinkel et al. | 297/408 X |
| 6,616,235 B1 | 9/2003 | Khavari | |
| 6,880,890 B1 * | 4/2005 | DeBrabant | 297/408 |
| 7,008,019 B2 * | 3/2006 | Lampke et al. | 297/408 |
| 7,549,704 B1 * | 6/2009 | Chou et al. | 297/408 |
| 7,681,954 B2 * | 3/2010 | Barrou | 297/408 |
| 7,717,517 B2 * | 5/2010 | Yamane et al. | 297/408 |
| 2002/0121802 A1 | 9/2002 | McMillen | |
| 2007/0164593 A1 * | 7/2007 | Brockman | 297/408 |
| 2007/0170766 A1 * | 7/2007 | Brawner | 297/408 |
| 2009/0218874 A1 * | 9/2009 | Meiller et al. | 297/408 |
| 2010/0026074 A1 * | 2/2010 | Sayama | 297/408 |
| 2010/0072803 A1 * | 3/2010 | Sayama | 297/408 |
| 2010/0078972 A1 * | 4/2010 | Sayama | 297/408 |
| 2010/0141008 A1 * | 6/2010 | Augade et al. | 297/408 |
| 2010/0244526 A1 * | 9/2010 | Kajimoto | 297/408 X |
| 2011/0175421 A1 * | 7/2011 | Grable | 297/408 |
| 2011/0221250 A1 * | 9/2011 | Little | 297/408 |
| 2011/0227387 A1 * | 9/2011 | Kolich | 297/408 |

FOREIGN PATENT DOCUMENTS

| | | |
|---|---|---|
| EP | 1356987 A | 10/2003 |
| EP | 1495909 A | 1/2005 |
| EP | 1580067 A | 9/2005 |
| GB | 1517817 A | 7/1978 |

* cited by examiner

MULTIMODAL HEADREST FOR VEHICLE SEAT

CROSS-REFERENCE TO RELATED APPLICATIONS

This application claims priority to and the benefit of International Application PCT/FR2008/051034 filed on 10 Jun. 2008, which claims priority to French Application No. 07 04275 filed on 15 Jun. 2007, the disclosures of which are incorporated by reference in their entireties.

BACKGROUND

1. Field

The aspects of the disclosed embodiments relate to a head restraint for a vehicle seat, in particular an aircraft seat. More particularly, the aspects of the disclosed embodiments relate to a head restraint intended to be installed on seats whose occupants require head support both when wearing a helmet and when not.

2. Brief Description of Related Developments

A head restraint for a vehicle seat is generally produced so as to provide a seat occupant with comfort and safety. This head support, which continues the backrest of the seat, such as for example a pilot's seat in the cockpit of an aircraft, supports the pilot's head and helps to reduce cervical tension due to the weight of the pilot's head when he is performing an operating or flying task.

In order to provide greater comfort and to fulfill their role in different use configurations, existing head restraints are adjustable for height and/or for forward/rearward inclination in order to adjust the position of the head restraint with respect to the pilot's head in order to provide either occipital or cervical support.

However, the means for adjusting the height and/or inclination of these head restraints are usually controlled by separate mechanisms, and this impairs rapid manipulation of these means.

In addition, these head restraints, when they need to be used sometimes in a configuration where the pilot is not wearing a helmet and sometimes in a configuration where the pilot is wearing a helmet, such as for example on board a military aircraft, are badly suited to one or the other of these configurations, since they cannot be adjusted to take account of the extra occipital thickness created by the helmet.

The implementation of a head restraint which combines the two adjusting possibilities in a single mechanism while being able to support the pilot's head both with and without a helmet is thus significant for simplifying the adjusting means.

SUMMARY

According to one aspect of the disclosed embodiments, a vehicle seat has a backrest on which a head restraint is fitted, said head restraint having a cushion for supporting the head of a seat occupant who may or may not, depending on the circumstances, be wearing a protective helmet, characterized in that the cushion has at least three stable positions:

a first position for cervical support of the seat occupant's head, in which position the head restraint provides cervical support whether or not a helmet is being worn, a second position for occipital support of the seat occupant's head, in which position the head restraint provides occipital support when a helmet is not being worn, a third position for occipital support of the seat occupant's head, in which position the head restraint provides occipital support when a helmet is being worn.

Advantageously, the cushion has a first occipital support surface when the cushion is in the second or third position and a second cervical support surface when the cushion is in the first position.

The position of the cushion is changed between the at least three stable positions by means of rotations about a single rotational axis, the positions of the support surfaces of the cushion in each of the at least three stable positions of said cushion being determined by:

positioning the rotational axis at a height with respect to the seat substantially between the hollow of the nape and an upper part of the nape of a pilot of generally average size, positioning the first surface with respect to the rotational axis, positioning the second surface with respect to the rotational axis.

Preferably, the cushion has two translational positions along the rotational axis: a stable position in which the cushion is locked and an unstable position in which the cushion can rotate freely about the rotational axis.

In order for the cushion to rotate, said cushion is attached to a first hollow rotary shaft, the axis of which coincides with the rotational axis and which slides and revolves about a second, coaxial rotary shaft held such that it is fixed at the ends by two mutually parallel plates positioned laterally on an upper part of the seat backrest.

The first rotary shaft has at one of its ends a first revolving component attached to said first rotary shaft and having at least one locking pin which engages in an aligned recess, among a plurality of recesses, made in a first plate, when the cushion is in a stable position.

Preferably, spring means are positioned around the second rotary shaft between an inner face of the first plate and an outer face of a second revolving component located at another end of the first rotary shaft. In order to unlock the cushion and modify the position of the cushion from one stable position to another, said spring means are compressed by pushing said cushion laterally and the at least one locking pin is removed from its recess.

One aspect of the disclosed embodiments also relates to a head restraint for a vehicle seat, having a cushion for supporting the head of a seat occupant, characterized in that the cushion has at least three stable positions:

a first position for cervical support of the occupant's head, in which position the head restraint provides cervical support whether or not a helmet is being worn, a second position for occipital support of the seat occupant's head, in which position the head restraint provides occipital support when a helmet is not being worn, a third position for occipital support of the seat occupant's head, in which position the head restraint provides occipital support when a helmet is being worn.

BRIEF DESCRIPTION OF THE DRAWINGS

The detailed description of the disclosed embodiments is given with reference to the figures, in which.

DETAILED DESCRIPTION

Figure 1:
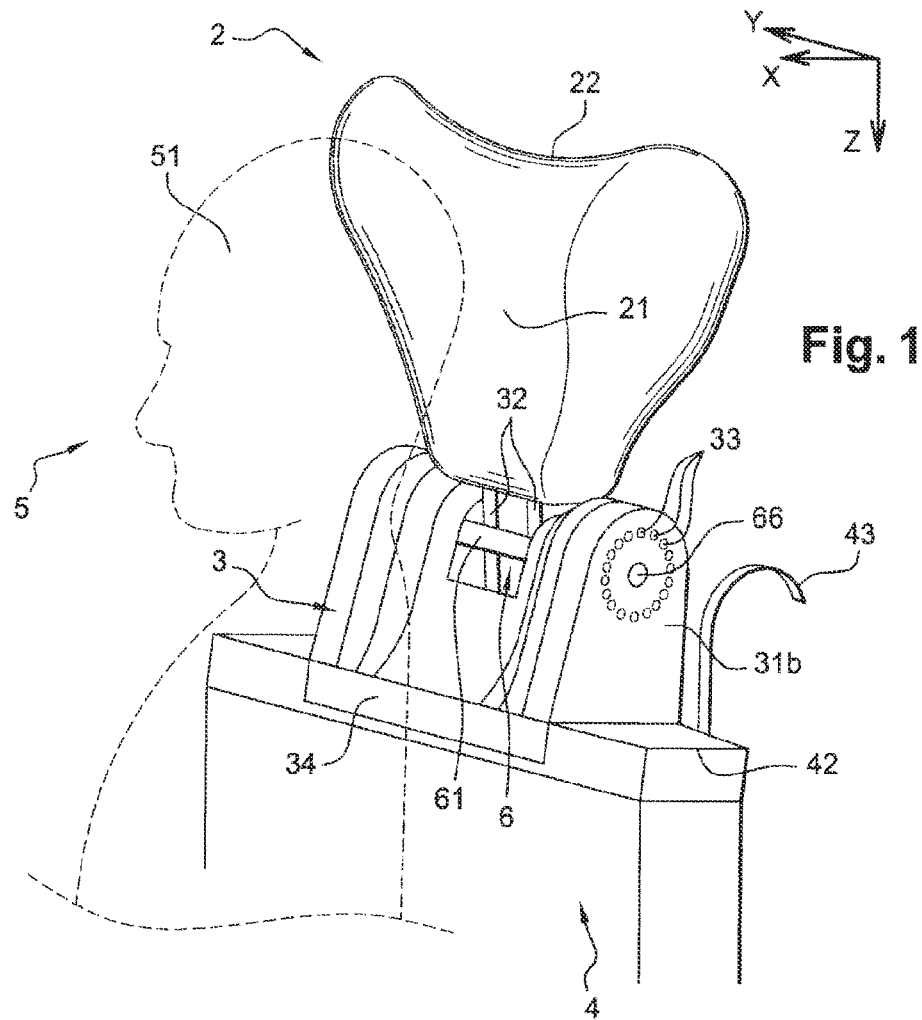
FIG. 1 shows a schematic view of a head restraint according to an aspect of the disclosed embodiments.

A head restraint 1 according to the disclosed embodiment and as illustrated in FIG. 1 is intended to be fitted on the upper part 42 of a seat backrest 4, continuing said backrest, and has a cushion 2 able to support the head 51 of an occupant 5 of the seat.

The exemplary embodiment illustrated in FIGS. 1 to 5*b* is described in the case of a head restraint 1 intended to be fitted on a military aircraft pilot's seat, but the aspects of the disclosed embodiment can also be applied to any seat whose occupant needs head support both when wearing a helmet and when not.

The cushion 2 has:

a first support surface 21 shaped to fit the curvature of the occiput of the head 51 of the pilot 5, a second support surface 22 shaped to fit the curvature of the nape of the head 51 of the pilot 5.

In order to adjust the head restraint to the morphology of the pilot and to his use or non-use of a helmet 52, the cushion 2 is positioned with respect to the head 51 of the pilot 5 substantially along the X and Z axes in the reference frame of the aircraft, that is to say by moving it forward/rearward (X axis) or upward/downward (vertical or Z axis) between at least two stable positions:

a characteristic cervical support position, and
a characteristic occipital support position.

To perform adjustments in the X or Z directions, the head restraint 1 has an adjusting means 6 positioned between the upper part 42 of the seat backrest 4 and the cushion 2.

Figure 2:
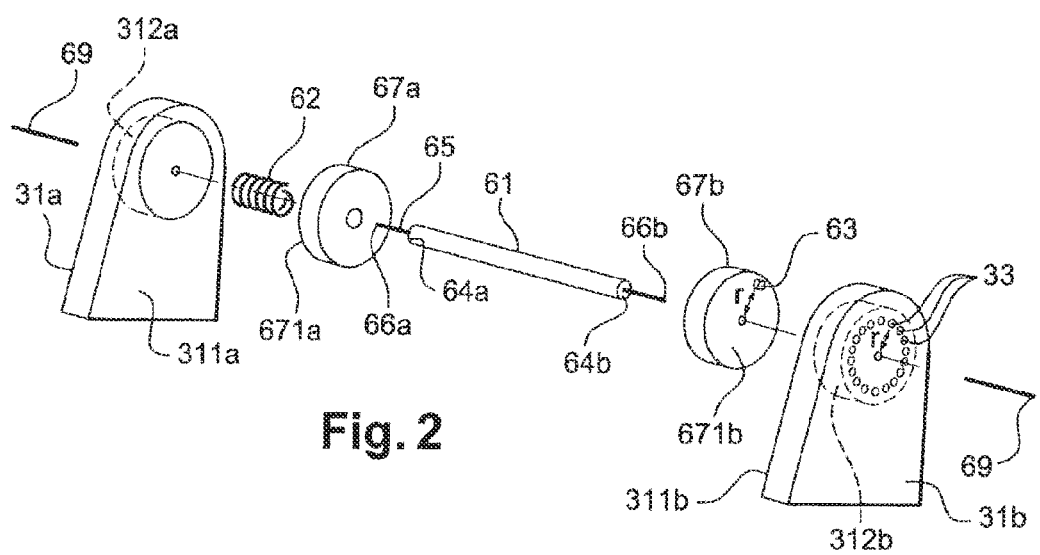
FIG. 2 shows an exploded view of an adjusting mechanism for the head restraint according to the disclosed embodiment.

The adjusting means 6, as illustrated in FIG. 2, has a first, hollow rotary shaft 61 which slides and revolves around a second, coaxial rotary shaft 65, said second rotary shaft 65 extending along a rotational axis 69 to occupy all or some of a width of the seat backrest 4.

The second rotary shaft 65 is held such that it is fixed at the ends 66*a*, 66*b* by two mutually parallel plates 31*a*, 31*b* positioned laterally on a thickness of the seat backrest 4 along the X axis.

The first rotary shaft 61, which is substantially shorter than the second rotary shaft 65, has at each of its ends Ma, 64*b* a revolving component 67*a*, 67*b*, for example in the form of a disk centered on each end Ma, 64*b*.

The plate 31*a*, or 31*b*, has a hollowed out region 312*a*, or 312*b*, creating a housing to hold the component 67*a*, or 67*b*, respectively.

Spring means 62, for example a spring, positioned around the second rotary shaft 65 between an inner face 311*a* of the first plate 31*a* and an outer face 671*a* of the revolving component 67*a*, exert a pressure on the outer face 671*a*. Said spring means are partially prestressed when the cushion 2 is in a stable position.

Once it has been assembled, the second rotary shaft 65 is held such that it is fixed in bearings at the two plates 31*a*, 31*b*. The revolving components 67*a*, 67*b* are attached to the first rotary shaft 61, said first rotary shaft sliding and revolving around the second rotary shaft 65.

The revolving component 67*b* has at least one locking pin 63, located at a radius r from the end 64*b* of the rotational axis 69 of the rotary shaft 61, on an outer face 671*b* opposite an inner face 311*b* of the second plate 31*b*.

The second plate 31*b* has recesses 33 positioned so as to be in a circle of radius r centered on the rotational axis 69 of the second rotary shaft 65, the recesses 33 being dimensioned such that the at least one locking pin 63 easily engages in them without excessive play. The at least one locking pin 63 may have, for example, a slightly rounded end or a bevel.

Preferably, the revolving component 67*b* has two locking pins 63, each locking pin 63 engaging with a recess 33 in order to improve the locking of the cushion 2.

The cushion 2 is attached to the first rotary shaft 61, for example by two rods 32, as illustrated in FIG. 1, which are substantially parallel and fixed to the rotary shaft 61, substantially perpendicular to said rotary shaft 61, said rods having a sufficient area of contact with the rotary shaft 61 to provide sufficient strength with no risk of excessive bearing.

When the cushion 2 is in a stable position, the spring means 62 are substantially prestressed between the component 67*a* and the plate 31*a*, the component 67*b* is in contact with the plate 31*b* at its outer face 671*b* and the at least one locking pin 63 is positioned in a recess 33 in the plate 31*b*, the effect of this being that the cushion 2 is held in a stable position. In order to modify the position of the cushion 2 from one stable position to another, the pilot 5 unlocks the current stable position by pushing the cushion 2 sideways, from the end nearest the plate 31*b* having the recesses 33, so as to compress the spring means 62 and to remove the at least one locking pin 63 from its recess 33. Advantageously, one hand is used for pushing.

During pushing, the first rotary shaft 61 and the revolving components 67*a*, 67*b* undergo a translational movement by sliding along the second rotary shaft 65, and the spring means 62, which were holding the at least one locking pin 63 in position in one of the recesses 33 in the second plate 31*b*, are compressed by the component 67*a*. By means of this translational movement which also involves the component 67*b*, the at least one locking pin 63 is released from the recess 33 in the plate 31*b* in which it was engaged before translation. The cushion 2, attached to the first rotary shaft 61, is thus free to pivot, the pressure on said cushion continuing to compress the spring means 62. When the cushion 2 has reached a desired position, the sideways pressure on said cushion is released. The spring means 62 expand, pushing back the first rotary shaft 61 and the revolving components 67a, 67b until the component 67b comes into contact with the plate 31b at its outer surface 67b. The at least one locking pin 63 enters one of the aligned recesses 33 in the plate 31b, automatically locking the cushion 2 in position, the new position becoming stable.

Advantageously, the rotational axis 69 of the first rotary shaft 61 is positioned substantially at a level of the hollow of the nape of a pilot of average size, and preferably in an upper part of the nape, that is to say substantially above the hollow of the nape. Thus, rotating the cushion 2 enables a forward/rearward and upward/downward combination in a single, angular, movement.

Advantageously, the self-locking stable positions prevent the head restraint 1 rocking forward, for example when another crew member leans on the cushion 2.

When the cushion 2 is in a substantially high position, the occiput of the head 51 of a pilot 5 is supported by the first surface 21 of the cushion 2, whether the pilot is wearing a helmet or not.

When the cushion 2 is in a low forward position, the nape of the head 51 of the pilot 5 is supported by the second surface 22 of the cushion 2. Thus, said cushion may be placed in a low position in order to partially relieve the head 51 of the weight it bears, even when the pilot 5 is wearing a helmet, since the helmet 52 does not cover the nape.

Advantageously, the recesses 33 made in the plate 31b determine a set of angular positions of the cushion 2, enabling said cushion to be adapted easily to the morphology of the pilot 5, whether or not said pilot is wearing a helmet 52, and thus to the extra occipital thickness created by said helmet, during flying tasks. Thus, the head restraint 1 can be adapted to numerous pilot sizes, in particular for pilots between 1570 mm and 1905 mm and according to the standards MIL-HDBK-759C, which are generally followed by other standards used for designing cockpits.

The positions of the cushion 2 for occipital support and cervical support are different for a tall pilot than for a short pilot or a pilot of average size, as illustrated in FIGS. 3a to 4b. In addition, the position of the cushion 2 for occipital support is different depending on whether the pilot is wearing a helmet or not.

Figure 3A:
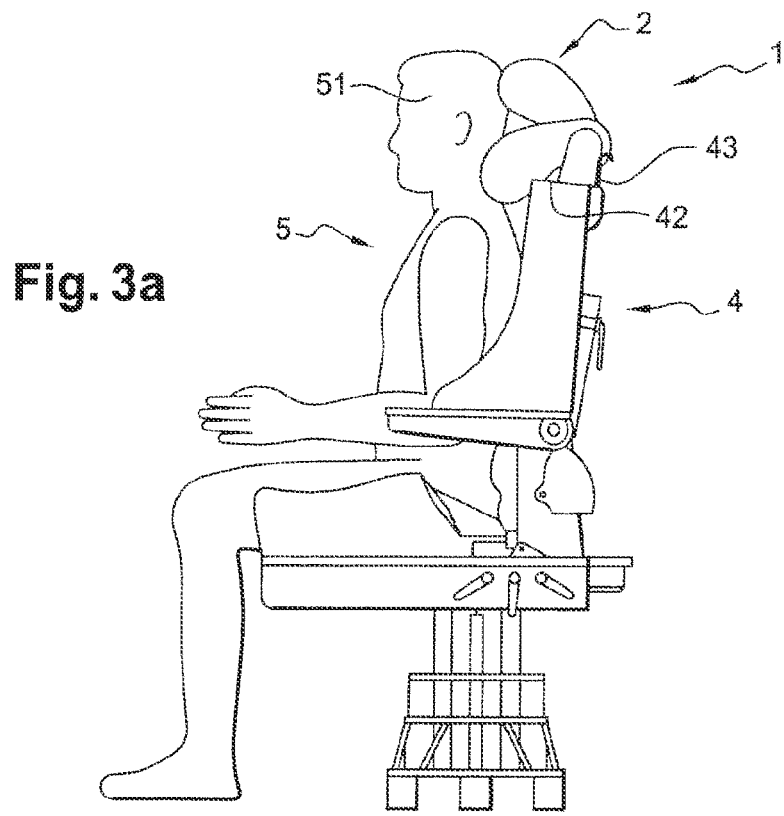
FIG. 3a shows a profile view of a seat, and of its occupant, having a head restraint according to the disclosed embodiment illustrating two positions of the head restraint for occipital support and cervical support for a short occupant not wearing a helmet.
Figure 3B:
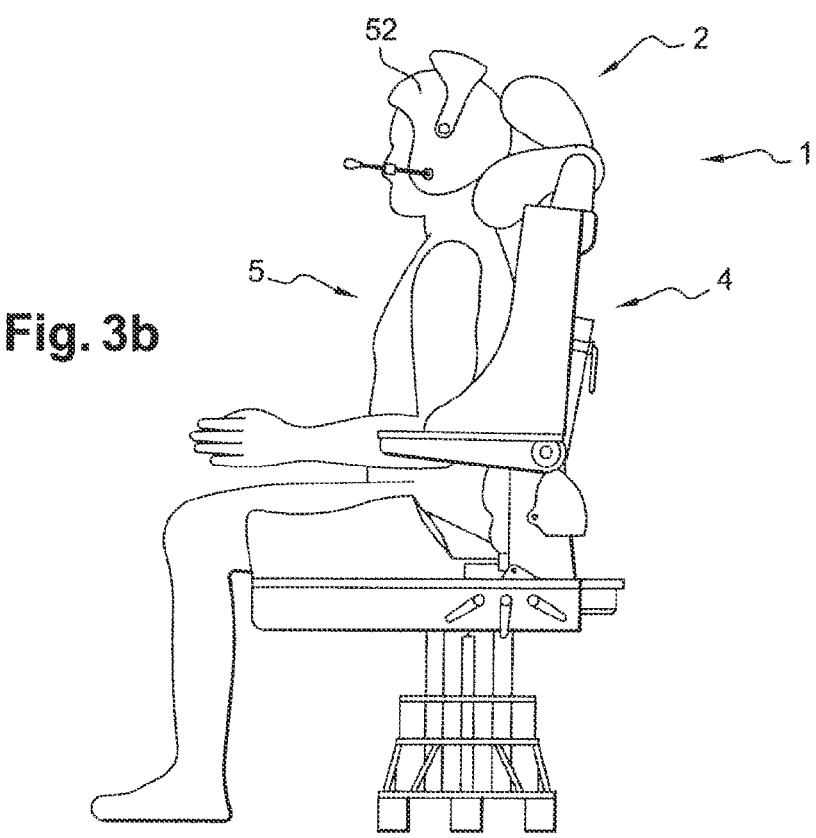
FIG. 3b shows a profile view of a seat, and of its occupant, having a head restraint according to an aspect of the disclosed embodiments illustrating two positions of the head restraint for occipital support and cervical support for a short occupant wearing a helmet.

FIG. 3a illustrates the occipital support and the cervical support for a short pilot not wearing a helmet, while FIG. 3b illustrates the same two supports for a short pilot wearing a helmet.

Figure 4A:
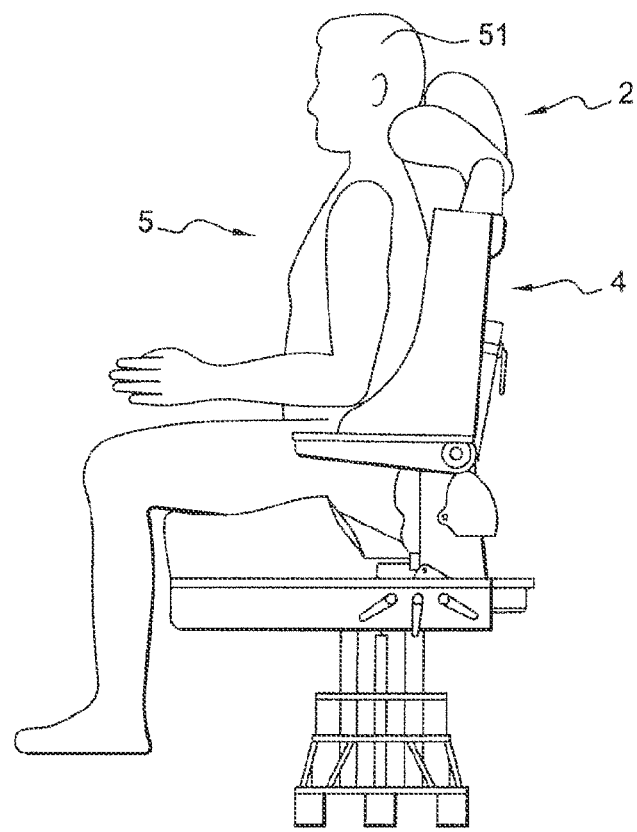
FIG. 4a shows a profile view of a seat, and of its occupant, having a head restraint according to an aspect of the disclosed embodiments illustrating two positions of the head restraint for occipital support and cervical support for a tall occupant hot wearing a helmet.
Figure 4B:
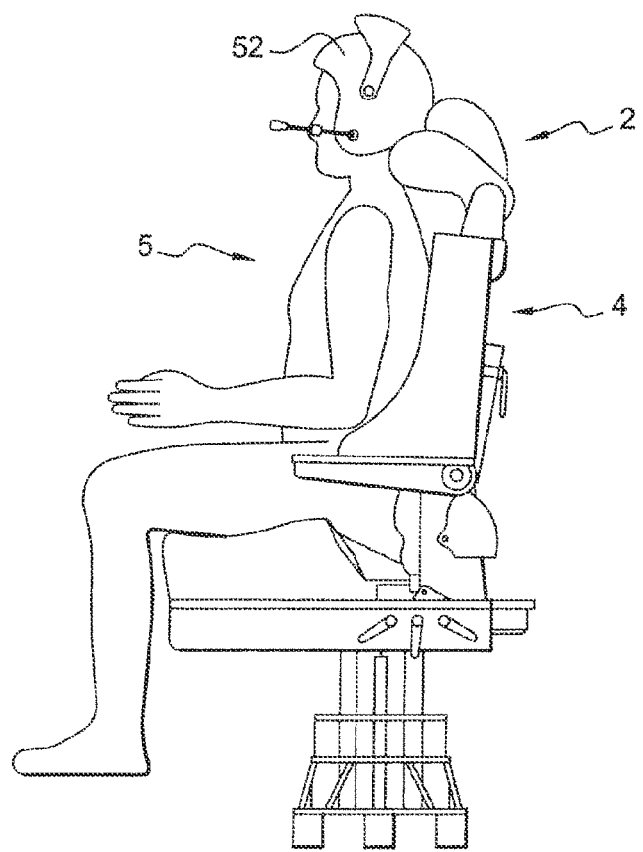
FIG. 4b shows a profile view of a seat, and of its occupant, having a head restraint according to an aspect of the disclosed embodiments illustrating two positions of the head restraint for occipital support and cervical support for a tall occupant wearing a helmet.

FIG. 4a illustrates the occipital support and the cervical support for a tall pilot not wearing a helmet, while FIG. 4b illustrates the same two supports for a tall pilot wearing a helmet.

Figure 5A:
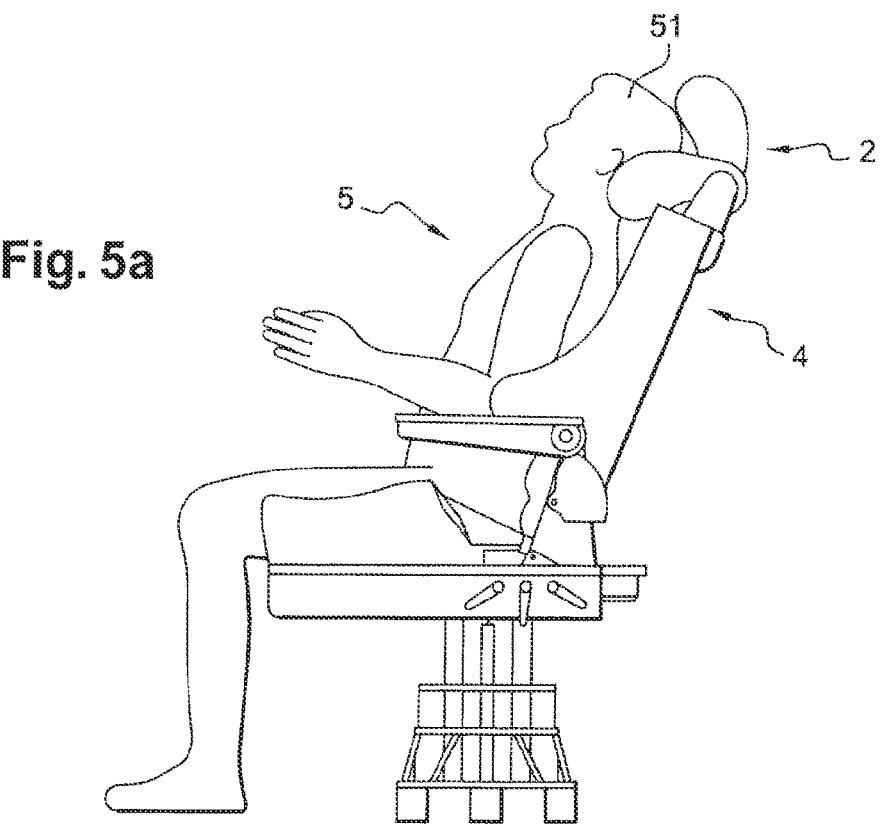
FIG. 5a shows a profile view of a seat, and of its occupant, having a head restraint according to an aspect of the disclosed embodiments illustrating two positions of the head restraint for occipital support and cervical support for a short pilot not wearing a helmet, when the backrest is inclined toward the rear.
Figure 5B:
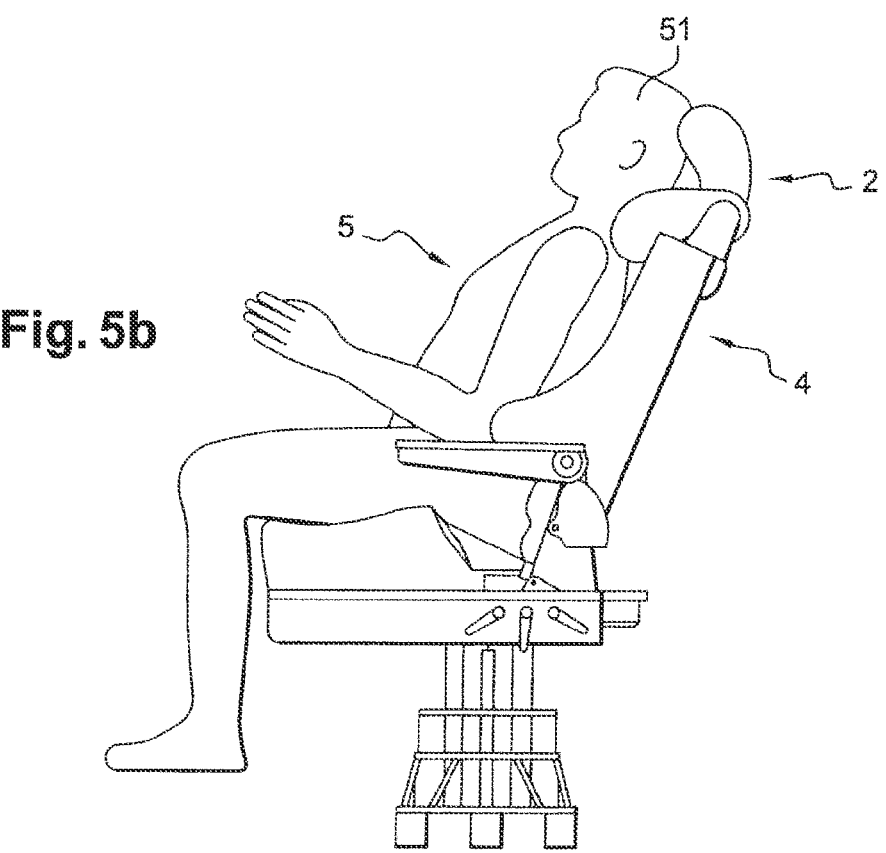
FIG. 5b shows a profile view of a seat, and of its occupant, having a head restraint according to an aspect of the disclosed embodiments illustrating two positions of the head restraint for occipital support and cervical support for a tall pilot not wearing a helmet, when the backrest is inclined toward the rear.

Advantageously, when the seat is inclined rearward, the cushion 2 can also be positioned to provide the occipital support or cervical support necessary for increasing the comfort of the pilot and more particularly when said pilot is in a rest position, whatever the morphology of the pilot, as illustrated in FIGS. 5a and 5b.

Advantageously, in order to improve access to the controls of a ceiling panel, the cushion 2 has in addition a stable position, in a high position substantially to the rear, in which the pilot 5, whether or not he is wearing a helmet, is not hindered by contact with the cushion 2.

Furthermore, when the cushion 2 is in the high position to the rear, it limits the rearward movement of the head 51 of the pilot 5 when said head is subjected to possibly significant accelerations or vibrations, thereby reducing the risk of injuries or musculoskeletal problems in the region of the cervical spine.

In order to improve accessibility to and the visibility of the ceiling panel, the cushion 2 is narrower than the seat backrest.

Preferably, the plates 31a, 31b are spaced apart at a distance smaller than the width of the seat backrest in order to enable the attachment of a suspending means 43, for example a hook, on one of the ends of the upper part 42 of the seat backrest 4 in order to attach the helmet thereto when said helmet is not being used by the pilot, keeping said helmet readily accessible from the seat.

In order to protect the head 51 of the pilot 5 from the adjusting means 6, a frame 3, bearing on the two plates 31a, 31b, covers the adjusting means 6 and has a form adapted to the form of the cushion so as not to hinder movements of the cushion 2 when the latter is rotating. Said frame has extensions 34 enabling it to be attached to the upper part 42 of the seat backrest 4.

Thus, the head restraint 1 can be used by any pilot and for different functions: as a place for resting the head during the flying phase or as a place for resting the nape during the rest phase, whether or not the pilot is wearing a helmet, the change from one function to another being carried out by way of a simple manipulation of the head restraint with one hand, a sideways push to unlock the cushion, a rotation to select the position and then releasing the cushion to lock it again.

The head restraint according to the disclosed embodiments thus enables a pilot, whether he is wearing a helmet or not, to combine various vertical or inclination adjustments by means of a single mechanism and a single degree of freedom, rotation.

The invention claimed is:

1. A vehicle seat, having a backrest on which a head restraint is fitted, said head restraint having a cushion for supporting the head of a seat occupant who may or may not be wearing a protective helmet,
   wherein the cushion has at least three stable positions:
      a first position for cervical support of the seat occupant's head, in which position the head restraint provides cervical support whether or not a helmet is being worn,
      a second position for occipital support of the seat occupant's head, in which position the head restraint provides occipital support when a helmet is not being worn,
      a third position for occipital support of the seat occupant's head, in which position the head restraint provides occipital support when a helmet is being worn,
   wherein the cushion is attached to a first, hollow rotary shaft, the axis of which coincides with a rotational axis of the cushion and which slides and revolves about a second, coaxial rotary shaft having ends fixed by two mutually parallel plates positioned laterally on an upper part of the seat backrest.

2. The seat according to claim 1, wherein the cushion has a first occipital support surface when the cushion is in the second or third position and a second cervical support surface when the cushion is in the first position.

3. The seat according to claim 2, wherein the position of the cushion is changed between the at least three stable positions by means of rotations about the rotational axis of the cushion, the positions of the support surfaces of the cushion in each of the at least three stable positions of said cushion being determined by:

positioning the rotational axis at a height with respect to the seat substantially between a hollow of the nape and an upper part of the nape of a pilot of generally average size, positioning the first surface with respect to the rotational axis, positioning the second surface with respect to the rotational axis.

4. The seat according to claim 3, wherein the cushion has two translational positions along the rotational axis: a stable position in which the cushion is locked and an unstable position in which the cushion can rotate freely about the rotational axis.

5. The seat according to claim 1, wherein which the first rotary shaft has at one of its ends a first revolving component attached to said first rotary shaft and having at least one locking pin which engages in an aligned recess of a plurality of recesses made in at least one of the two mutually parallel plates, when the cushion is in a stable position.

6. The seat according to claim 1, further comprising spring means positioned around the second rotary shaft between an inner face of at least one of the two mutually parallel plates and an outer face of a second revolving component located at another end of the first rotary shaft, said spring means being compressed by pushing the cushion laterally in order to unlock said cushion.

7. A head restraint for a vehicle seat, having a cushion for supporting the head of a seat occupant, wherein the cushion has at least three stable positions:

a first position for cervical support of the occupant's head, in which position the head restraint provides cervical support whether or not a helmet is being worn, a second position for occipital support of the seat occupant's head, in which position the head restraint provides occipital support when a helmet is not being worn, a third position for occipital support of the seat occupant's head, in which position the head restraint provides occipital support when a helmet is being worn, wherein the cushion is attached to a first, hollow rotary shaft, the axis of which coincides with a rotational axis of the cushion and which slides and revolves about a second, coaxial rotary shaft having ends fixed by two mutually parallel plates arranged to be positioned laterally on an upper part of a backrest of the vehicle seat.

\* \* \* \* \*